Feb. 6, 1940.                J. W. DAWSON                2,189,601
                         WELDING TIMING CIRCUITS
                          Filed May 14, 1937
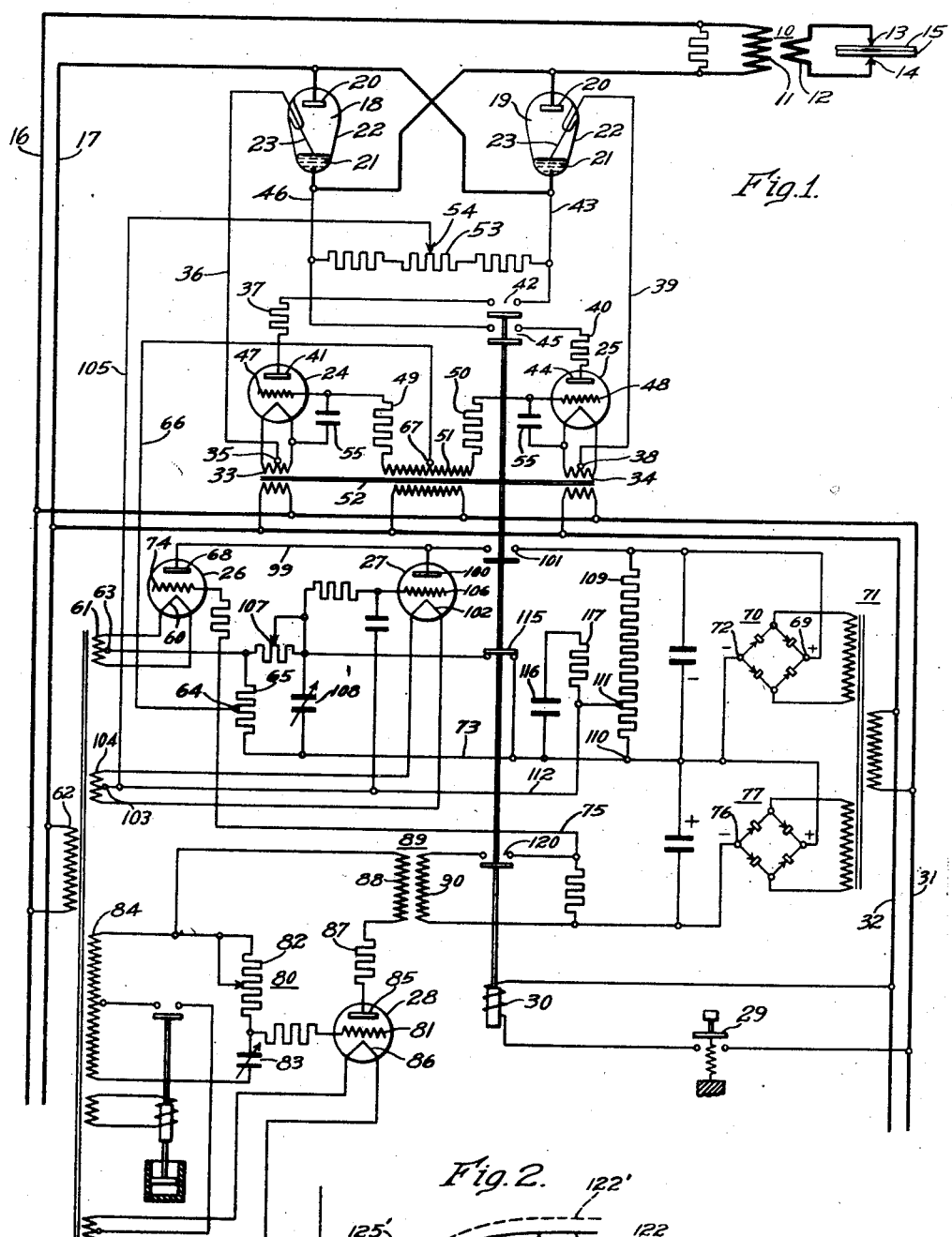
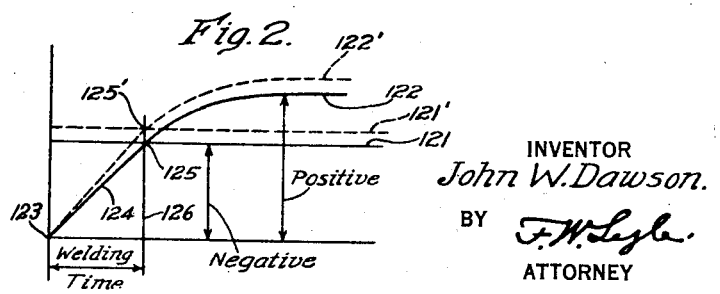
WITNESSES:                                    INVENTOR
C. J. Weller.                              John W. Dawson.
R. W. Bailey                               BY F. W. Lyle.
                                              ATTORNEY Patented Feb. 6, 1940

2,189,601

UNITED STATES PATENT OFFICE 2,189,601

WELDING TIMING CIRCUITS

John W. Dawson, East McKeesport, Pa., assignor to Westinghouse Electric & Manufacturing Company, East Pittsburgh, Pa., a corporation of Pennsylvania Application May 14, 1937, Serial No. 142,564

13 Claims. (Cl. 250—27)

My invention relates to electric control systems, and it has particular relationship to control systems for electric welding.

This application is a continuation in part of my copending application Serial No. 34,003, filed July 31, 1935, for Control systems.

It is an object of my invention to provide for accurately applying a predetermined number of cycles of alternating current to a load circuit.

Another object of my invention is to provide for applying a predetermined number of half cycles of alternating current to a load circuit for performing spot welding operations and the like.

Another object of my invention is to avoid variation in accuracy of timing because of variation in sources of current.

Other objects and advantages of the invention will be apparent from the following description and drawing, in which:

Figure 1 is a diagrammatic view illustrating the embodiment of my invention in a welding circuit; and Fig. 2 is a diagram illustrating the positive and negative components applied to the grid of the stop tube.

In prior art devices utilizing electronic tubes for the control of alternating current and its application to a load circuit, several devices have been utilized for the initiating and termination of the electric energy to the load circuit. These devices have been arranged, so that one direct source of energy will energize one portion of the control circuit and another direct source will energize the other portion of the circuit with the result that variations in these sources of energy will effect the accuracy of the timing of the control circuit.

It is a specific object of my invention to provide a starting discharge device and a cut-off discharge device that will have positive and negative timing components from the same source of energy, and consequently there will be no variation in the accuracy of timing due to any relative variation between the two individual sources which may not change in proportion.

Referring to the figures of the drawing, the reference character 10 designates generally a welding transformer having a primary winding 11 and a secondary winding 12. The secondary winding 12 is connected to the customary welding circuit in which the welding electrodes 13, 14 are diagrammatically represented as applied to objects 15 which are to be welded together. The primary winding 11 of the transformer is connected by means of conductors 16 and 17 to a source of alternating current.

In order to control the application of the welding current from the source of alternating current to the transformer 10, vapor electric devices shown generally at 18 and 19 are provided. The devices 18 and 19 are of the mercury vapor type having an anode 20 and a mercury pool 21 as a cathode in the bottom of a container 22. In order to render the vapor electric devices 18 and 19 conducting, a starting electrode 23 is provided.

Although other types of starting electrodes may be utilized, I prefer to use a high resistance electrode immersed in the mercury and composed of carborundum or boron carbide. This type of starting electrode is well known in the art and is more specifically described in Patent 2,069,283, issued February 2, 1937, to Slepian.

The two devices 18 and 19 are disclosed in order that both directions of the alternating current may be controlled in the application to the welding circuit since each device acts as a rectifier as well as being a controllable conductor.

When a certain amount of current is caused to flow through the starting electrode 23 into the mercury pool 21, a cathode spot is formed which furnishes a source of electrons which in turn cause ionization of the mercury vapor within the container 21 and under the influence of positive anode potential, the tube becomes conducting. Thus, it is only necessary to pass sufficient starting current through the starting or ignition electrode 23 to form the cathode spot at a predetermined time in the proper half cycle in the alternating current wave to render the vapor electric devices conducting for the remainder of that particular half cycle. In order to conduct succeeding half cycles of alternating current, the vapor electric devices 18 and 19 are connected inversely. That is, the anode 20 of devices 18 is connected to the cathode 21 of device 19 and the anode 20 of device 19 is connected to the cathode 21 of device 18. It will, therefore, be evident that if the vapor electric devices 18 and 19 are energized in turn during successive half cycles, current from the source of alternating current will flow to the transformer 10 as long as this condition is maintained.

The control system involves the utilization of control tubes for supplying ignition current to control the discharge in the tubes 18 and 19 and also electronic devices for accurately operating and stopping the operation of these tubes at predetermined points on the half cycles of alternating current. In my preferred embodiment illustrated, I utilize tubes 24 and 25 for controlling the discharge in the devices 18 and 19 through the ignitor or starter 23 and then I utilize a starting tube 26, a cut-off tube 27 for the discharge and in addition for starting the discharge at a predetermined point on the first half cycle of the power period a further tube 28. The application of this control system is preferably instituted by an externally operated switch 29 which may be operated manually or by a cam on the welding machine. In other words, when the operator desires to perform the welding operation, he depresses the switch 29, energizing the relay 30 from the conductors 31, 32 connected to the source of alternating current. The relay 30, in turn, operates various individual switches hereinafter referred to in the description of the control circuit.

The cathodes of the tubes 24 and 25 are energized from the alternating circuit by transformers 33 and 34, respectively. The midpoint of the secondary of the transformer 33, namely 35, has a connection 36 extending to the ignitor or starter 23 of tube 18. Likewise, the midpoint 38 of the secondary of transformer 34 is connected through connection 39 to the starting electrode 23 of the tube 19. The anode 41 of tube 24 is connected through resistance 37 and switch point 42 of the starting relay 30 to the connection 43 to the anode 20 of tube 18. The anode 44 of tube 25 is likewise connected through resistance 40 and switch 45 of the relay 30 to the connection 46 to the anode 20 of tube 19. The grids 47 and 48 of tubes 24 and 25 are connected through suitable resistances 49 and 50 to opposite ends of the secondary 51 of transformer 52 connected to the source of alternating current. The grids and cathodes of tubes 24 and 25 may be energized from secondary windings on the same transformer instead of the individual transformers disclosed. Between the conductors 43 and 46 extending to the cathodes and anodes of the tubes 18 and 19 previously described is a resistance 53. The variable tap 54 on this resistor is to compensate for any slight difference between the tubes 18 and 19 in operation. The further function of this resistance 53, together with transformer winding 51, connecting the grids and cathodes of the tubes 24 and 25 is to nullify the alternating-current potential which would otherwise exist on the grids 47 and 48 of tubes 24 and 25, because of their circuit locations. Resistances 49 and 50 are to limit grid currents, condensers 55 prevent faulty operation of the tubes due to electrostatic pickup of grid by the anode.

Tube 26 is utilized as a starting device. Its cathode 60 is energized through the secondary 61 of transformer 62 and the midpoint 63 of this secondary is connected through the midpoint 64 of resistance 65 and connections 66 to the midpoint 67 of the transformer secondary 51 connected to the grids 47 and 48 of the tubes 24 and 25. The anode 68 of tube 26 is connected through contact 101 to the positive terminal 69 of a source of direct current potential disclosed as the rectifier bridge 70 connected to a transformer 71 energized from the source of alternating current. The negative terminal 72 is connected through conductor 73 to the resistance 65, cathode transformer secondary 61 and cathode 60. The grid 74 of tube 26 is connected through a connection 75 to the negative terminal 76 of a similar rectifier bridge 77 also energized by the alternating-current source. These rectifier bridges are preferably of the well known copper oxide dry plate type. The negative potential from the rectifier bridge 77 on the grid 74 constitutes a discharge preventing bias normally applied to the control electrode of the starting tube 26.

The operation of the starting tube 26 is controlled by means of the tube 28 previously referred to which controls the point of initiation of tube 26 with respect to the voltage wave. This tube 28 is preferably of the hot cathode gaseous discharge type and is provided with a phase shifting control circuit 80 for the grid 81 of the tube. This phase shifting control circuit comprises an adjustable resistor 82 and an adjustable capacitor 83. The phase shifting circuit 80 is connected by means of a transformer 84 to the same source of alternating current as is applied to the anode 85 and cathode 86 of the timing tube 28. Alternating current for the timing tube 28 is provided from windings on the secondary of transformer 84. The output of timing tube 28 is applied to a circuit comprising the resistor 87 and a winding 88 of a transformer 89. The secondary winding 90 of the transformer 89 is indirectly connected to the grid 74 of the starting tube 26 when the switch 120 of relay 30 is closed, through the connection 75 which, as previously described, normally applies a negative discharge preventing potential to this grid 74.

The phase shifting circuit 80 is adjusted by means of the variable resistor 82 and variable capacitor 83 to render the start tube 26 conducting at the desired point in the cycle of operation of the alternating current source. The phase shifting circuit 80 will determine th exact point on the voltage wave that the tube 28 will be rendered conducting. The discharge in tube 28 permits current to flow through the primary winding 88 of transformer 89 and due to the steep wave front of the current applied, a sharp voltage surge will appear in the secondary winding 90 which will be applied, in turn, to the grid 74 of the starting tube 26. The peak valve of the surge is sufficient to overcome the negative potential of the source 77 and to positively bias the grid 74, thereby rendering the start tube 26 conducting. As soon as the start tube 26 becomes conducting, a positive potential is applied to the control tubes 24 and 25 and they will then function to establish the conductivity of tubes 18 and 19.

It will be noted that the cut-off space discharge device 27 has its anode 100 connected through switch 101 to the same positive terminal of the rectifier bridge 70 as the anode 68 of the starting tube 26. The cathode 102 of the cut-off tube 27 is connected through the midpoint 103 of the transformer secondary 104 by means of a connection 105 to the midpoint 54 of the resistance 53 across the anodes and cathodes of the tubes 18 and 19. The grid 106 of cut-off tube 27 is connected through adjustable resistance 107 to the cathode circuit 60 of the starting tube 26, an adjustable timing condenser 108 is connected to the cathode circuit 63, 60 of starting tube 26 and conductor 73 extending from the negative terminal of the direct-current rectifier bridge 70 to the resistance 65. The resistance or voltage divider 109 extends from the connection 99 between the anodes of tubes 26 and 27 to the point 110 to the conductor 73 connected to the grid 106 of tube 27. A tap 111 is taken from a point on the potentiometer and by means of connection 112 is applied to the circuit of cathode 102 of the cut-off tube 27. It will be noted that the point 110 with respect to tap 111 corresponds to the negative grid potential of the cut-off tube 27. The point 111 corresponds to the cathode potential of the tube 27.

The conduction of the tube 26 will apply potential across the resistor 65 and this potential acts to charge the condenser 108 through the variable resistance 107. After a time variable between adjustment of resistor 107, condenser 108 is sufficiently charged to raise the grid 106 of tube 27 to its breakdown point with respect to its cathode 102. With the breakdown of this tube positive potential is fed through the tube and its cathode transformer to wire 105 which action again throws the bias on control tubes 24 and 25 to a negative value stopping the further ignition of the tubes 18 and 19 and hence further welding current after the termination of the particular half-cycle.

Leads 66 and 105 are the timing circuit output leads. When neither tube 26 nor 27 is ignited the lead 66 is negative to lead 105. When the starting tube 26 discharges, the lead 66 becomes positive and the lead 105 becomes negative. When the stop tube ignites, the lead 66 again becomes negative in respect to the lead 105. During the period while lead 66 is positive in respect to lead 105, welding current can flow.

The weld has, accordingly, been completed by the automatic operation of tubes accurately timing the predetermined number of half cycles of alternating current. No manual operation by the operator in connection with the control circuit is necessary after the work 15 is in position, except for the depression of the switch 29. The sequence of the switches operated thereby is first 101 to energize rectifiers 70 and 77, then 45 and 42 together and then 120. After the weld has been completed, the pressure is released from switch 29 and the various switches operated by relay 30 will be released in reversed order, namely, 120, 42 and 45 and then 101, but the connection at switch 115 will be made to discharge the timing condenser 108 and have it ready for the next operation.

It will be noted that both the negative component of the timing voltage applied to tube 27, i. e. between point 110 and 111, and the positive component of timing voltage, i. e. the voltage across condenser 108, is derived from the same source 70 and, accordingly, variations in this source due to changing of temperature or other causes will equally affect the positive and negative components of grid voltage as applied to tube 27 and will not change therefore, the accuracy of timing following the discharge of tube 26. This condition is illustrated in Fig. 2 where 121 illustrates the value of the negative component applied from the source 70 to the grid 106 of the stop tube. Curve 122 illustrates the value of the positive component. The welding time starts at 123. During time 124 the condenser 108 is charging and at 125 the positive component reaches the value of the negative component and the stop tube 27 is actuated. If, however, the output of rectifier 70 is varied as because of change in temperature, etc., and 121 is changed to 121', curve 122 will likewise be correspondingly changed to 122' and the intersection of these two at 125' will be on the same time line 126, thus illustrating that any variation in the source 70 will not affect the welding time.

Various condensers and resistances are, of course, illustrated at desired places in the apparatus, some of which, as at 116 and 117, act as filters. It is apparent that many modifications, rearrangement of the number and type of elements and also the application of the control system illustrated may be made without departing from the spirit of the invention. Accordingly, I desire only such limitations to be imposed upon the following claims as is necessitated by the prior art.

I claim as my invention:

1. In a control system, in combination a source of alternating current, a load, circuit means connecting the source of alternating current to the load, a pair of inversely connected space-discharge devices interposed between the source of alternating current and the load for controlling the flow of current to the load, a control electrode in each of said space-discharge devices, a starting space discharge device for applying an energizing potential to the control electrodes to render said first mentioned space discharge devices conducting, a cut-off space-discharge device for effecting removal of the energizing potential from the control electrodes to render the pair of space-discharge devices non-conducting, said cut-off space-discharge device having a control electrode, and a common source of potential for supplying negative and positive components to the control electrode of said cut-off space-discharge device.

2. In a control system, in combination a source of alternating current, a load, circuit means connecting the source of alternating current to the load, at least one space-discharge device interposed between the source of alternating current and the load for controlling the flow of current to the load, a control electrode in said space-discharge device, a starting space discharge device for applying an energizing potential to the control electrode to render said first mentioned space discharge device conducting, a cut-off space-discharge device for effecting removal of the energizing potential from the control electrode to render the space-discharge device non-conducting and a common source of potential for energizing the main electrode system of both said starting space discharge device and said cut-off space-discharge device.

3. In a control system, in combination a source of alternating current, a load, circuit means connecting the source of alternating current to the load, at least one space-discharge device interposed between the source of alternating current and the load for controlling the flow of current to the load, a control electrode in said space-discharge device, a starting space discharge device for applying an energizing potential to the control electrode to render said first mentioned space discharge device conducting, a cut-off space-discharge device for effecting removal of the energizing potential from the control electrode to render the space-discharge device non-conducting, said cut-off space discharge device having a control electrode and a common source of potential for supplying negative and positive components to the control electrode of said cut-off space discharge device.

4. In a control system, in combination a source of alternating current, a load, circuit means connecting the source of alternating current to the load, a pair of inversely connected space-discharge devices interposed between the source of alternating current and the load for controlling the flow of current to the load, a control electrode in each of said space-discharge devices, a starting space discharge device for applying an energizing potential to the control electrodes to render said first mentioned space discharge devices conducting, a cut-off space-discharge device for effecting removal of the energizing potential from the control electrodes to render the pair of space-discharge devices non-conducting and the positive electrodes of said starting space-discharge device and said cut-off space-discharge device being connected together and to a common source of energizing potential for said devices.

5. In a control system, in combination a source of alternating current, a load, circuit means connecting the source of alternating current to the load, a pair of inversely connected space-discharge devices interposed between the source of alternating current and the load for controlling the flow of current to the load, a control electrode in each of said space-discharge devices, a starting space discharge device for applying an energizing potential to the control electrodes to render said first mentioned space discharge devices conducting, a cut-off space-discharge device for effecting removal of the energizing potential from the control electrodes to render the pair of space-discharge devices non-conducting, said cut-off space-discharge device having a control electrode, a source of electrical potential applying a negative component to the last mentioned control electrode and means energized from said last mentioned source of electrical potential for applying a positive component to the last mentioned control electrode of said cut-off space-discharge device and actuating the same.

6. In a control system, in combination a source of alternating current, a load, circuit means connecting the source of alternating current to the load, a pair of inversely connected space-discharge devices interposed between the source of alternating current and the load for controlling the flow of current to the load, a control electrode in each of said space-discharge devices, a starting space discharge device for applying an energizing potential to the control electrodes to render said first mentioned space discharge devices conducting, a cut-off space-discharge device for effecting removal of the energizing potential from the control electrodes to render the pair of space-discharge devices non-conducting, said cut-off space-discharge device having a control electrode and a discharge preventing bias normally applied thereto, the positive electrodes of said starting space-discharge device and said cut-off space-discharge device being connected together and to a common source of potential for energizing both said devices, means for initiating the discharge in said starting space-discharge device, and means responsive to the discharge in said starting space-discharge device overcoming the discharge preventing bias on said control electrode of said cut-off space-discharge device.

7. In a control system, in combination a source of alternating current, a load, circuit means connecting the source of alternating current to the load, a pair of inversely connected space-discharge devices interposed between the source of alternating current and the load for controlling the flow of current to the load, a control electrode in each of said space-discharge devices, a starting space discharge device for applying an energizing potential to the control electrodes to render said first mentioned space discharge devices conducting, a cut-off space-discharge device for effecting removal of the energizing potential from the control electrodes to render the pair of space-discharge devices non-conducting, said cut-off space-discharge device having a control electrode, a source of electrical potential applying a negative component to the last mentioned control electrode and means energized from said last mentioned source of electrical potential for applying a positive component to the last mentioned control electrode of said cut-off space-discharge device and actuating the same after a predetermined time lag.

8. In a control system, in combination a source of alternating current, a load, circuit means connecting the source of alternating current to the load, a pair of inversely connected space-discharge devices interposed between the source of alternating current and the load for controlling the flow of current to the load, a control electrode in each of said space-discharge devices, a starting space discharge device for applying an energizing potential to the control electrodes to render said first mentioned space discharge devices conducting, a cut-off space-discharge device for effecting removal of the energizing potential from the control electrodes to render the pair of space-discharge devices non-conducting, said cut-off space-discharge device having a control electrode, a source of electrical potential applying a negative component to the last mentioned control electrode and means energized from said last mentioned source of electrical potential for applying a positive component to the last mentioned control electrode of said cut-off space-discharge device and actuating the same after a predetermined time lag of a number of half-cycles of said first mentioned source of alternating current.

9. In a control system, in combination a source of alternating current, a load, circuit means connecting the source of alternating current to the load, at least one space-discharge device interposed between the source of alternating current and the load for controlling the flow of current to the load, a control electrode in said space-discharge device, a starting space discharge device for applying an energizing potential to the control electrode to render said first mentioned space discharge device conducting, a cut-off space-discharge device for effecting removal of the energizing potential from the control electrodes to render the space-discharge device non-conducting, said cut-off space-discharge device having a control electrode and a discharge preventing bias normally applied thereto, the positive electrodes of said starting space-discharge device and of said cut-off space-discharge device being connected together and to a common source of potential for energizing both said devices, means for initiating the discharge in said starting space-discharge device, and means responsive to the discharge in said starting space-discharge device overcoming the discharge preventing bias on said control electrode of said cut-off space-discharge device after a predetermined time lag of a number of half-cycles of said source of alternating current.

10. In a system applying a source of alternating current to a load, circuit means controlling the application of said source to said load including a starting space discharge device and a cut-off space-discharge device, the positive electrodes of said devices being connected together and to a common source of energizing potential for said devices.

11. In a system applying a source of alternating current to a load, circuit means controlling the application of said source to said load including a starting space discharge device and a cut-off space discharge device, said cut-off space discharge device having a control electrode and a discharge preventing bias normally applied thereto, the positive electrodes of said starting space discharge device and said cut-off space discharge device being connected together and to a common source of potential for energizing both said devices, means for initiating the discharge in said starting space discharge device and means responsive to the discharge in said starting space discharge device overcoming the discharge preventing bias on said control electrode of said cut-off space discharge device.

12. In a system applying a source of alternating current to a load, circuit means controlling the application of said source to said load including a starting space discharge device and a cut-off space discharge device, said cut-off space discharge device having a control electrode and a discharge preventing bias normally applied thereto, the positive electrodes of said starting space discharge device and said cut-off space discharge device being connected together and to a common source of potential for energizing both said devices, means for initiating the discharge in said starting space discharge device and means responsive to the discharge in said starting space discharge device overcoming the discharge preventing bias on said control electrode of said cut-off space discharge device, said last-mentioned means having a predetermined time lag of a number of half cycles of said alternating current.

13. In a system applying a source of alternating current to a load, circuit means controlling the application of said source to said load including a starting space discharge device and a cut-off space discharge device having a control electrode, potential means normally applying a negative potential to said control electrode, and means, charged from said potential means after the actuation of said starting space discharge device, applying a positive potential to said control electrode and actuating said cut-off space discharge device after a predetermined time delay.

JOHN W. DAWSON.